United States Patent
Akamatsu

(10) Patent No.: US 7,965,428 B2
(45) Date of Patent: Jun. 21, 2011

(54) IMAGE FORMING APPARATUS CONFIGURED TO CORRECT POSITIONAL ERROR OF A WRITTEN IMAGE

(75) Inventor: Hidenori Akamatsu, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 886 days.

(21) Appl. No.: 11/620,832

(22) Filed: Jan. 8, 2007

(65) Prior Publication Data

US 2007/0160939 A1    Jul. 12, 2007

(30) Foreign Application Priority Data

Jan. 10, 2006 (JP) ................. 2006-002619
Dec. 21, 2006 (JP) ................. 2006-344368

(51) Int. Cl.
*G03F 3/08* (2006.01)

(52) U.S. Cl. ......... 358/518; 358/296; 358/500; 430/357

(58) Field of Classification Search .................. 358/500, 358/515, 518; 430/357, 359
See application file for complete search history.

(56) References Cited

U.S. PATENT DOCUMENTS

| 6,418,295 B1 | 7/2002 | Sato | |
| 2006/0055902 A1* | 3/2006 | Ohkawara et al. | 355/47 |

FOREIGN PATENT DOCUMENTS

| EP | 1 498 785 A1 | 1/2005 |
| EP | 1498785 | * 1/2005 |
| JP | 10-213943 A | 8/1998 |
| JP | 2001034030 | * 2/2001 |
| JP | P2001-34030 A | 2/2001 |
| JP | 2003207976 | * 7/2003 |
| JP | P2003-207976 A | 7/2003 |
| JP | 2003-337456 | 11/2003 |
| JP | 2005-31263 | 2/2005 |
| JP | P2005-43422 A | 2/2005 |

* cited by examiner

Primary Examiner — Benny Q Tieu
Assistant Examiner — Martin Mushambo
(74) Attorney, Agent, or Firm — Oblon, Spivak, McClelland, Maier & Neustadt, L.L.P.

(57) ABSTRACT

A color image forming device, including: an optical scanning part; an image carrier where a latent image is formed by the optical scanning part; a developing part configured to develop the latent image of the image carrier; an endless belt configured to move so as to come in contact with the image carrier where the developed image is formed; an environment detection part provided at least at one of the optical scanning part, the image carrier, the developing part, and the endless belt, the environment detection part being configured to obtain environmental data; and a control part configured to implement positioning control based on the environmental data from the environment detection part.

10 Claims, 13 Drawing Sheets

(a)

(b)

(c)

(d)

IMAGE FORMING APPARATUS CONFIGURED TO CORRECT POSITIONAL ERROR OF A WRITTEN IMAGE

BACKGROUND OF THE INVENTION

1. Field of the Invention

The present invention generally relates to color image forming apparatuses, and more specifically, to a color image forming apparatus such as a copier, printer, or facsimile, having a function for correcting positional error of a written image.

2. Description of the Related Art

Conventionally, in an image forming apparatus configured to form images in color, a color image is formed by overlapping plural basic color images. Because of this, in order to overlap the basic color images on a recording medium precisely, positions of basic color images should be adjusted. A state where the positions of the basic color images are not adjusted but are shifted is called positional error. Due to generation of the positional error at the basic color images, color shifting is generated at the overlapped image.

In order to prevent the color shift, a mark for detecting the positional error of each of the basic colors is formed at an intermediate transferring medium and a position of the mark is detected so that whether the positional shift is generated is detected.

Techniques whereby the color shifting is prevented by correcting the position of the image of each of the basic colors when the positional error is generated are discussed in, for example, Japanese Laid-Open Patent Application Publication No. 2003-337456 and Japanese Laid-Open Patent Application Publication No. 2005-31263.

More specifically, Japanese Laid-Open Patent Application Publication No. 2003-337456 describes that, for the purpose of stabilization of the color shifting, a proper offset value whereby a color shifting amount with time is made minimum until next color shifting correction control time is added to a correction value so that writing start position or scanning width in a main scanning direction and writing start position in a sub-scanning direction are corrected.

In the technique of Japanese Laid-Open Patent Application Publication No. 2003-337456, while the color shifting is stabilized, it takes time for control for correcting the color shifting and therefore down time may be generated.

SUMMARY OF THE INVENTION

Accordingly, embodiments of the present invention may provide a novel and useful color image forming apparatus solving one or more of the problems discussed above.

More specifically, the embodiments of the present invention may provide a color image forming apparatus whereby down time can be avoided at the time of correcting color shifting.

One aspect of the present invention may be to provide a color image forming device, including: an optical scanning part; an image carrier where a latent image is formed by the optical scanning part; a developing part configured to develop the latent image of the image carrier; an endless belt configured to move so as to come in contact with the image carrier where the developed image is formed; an environment detection part provided at least at one of the optical scanning part, the image carrier, the developing part, and the endless belt, the environment detection part being configured to obtain environmental data; and a control part configured to implement positioning control based on the environmental data from the environment detection part.

In embodiments of the present invention discussed below, the optical scanning part corresponds to an optical beam scanning device 30; an image carrier corresponds to photosensitive body drums 14Y, 14M, 14C, and 14K and a photosensitive body 15; a developing part corresponds to developing devices 18Y, 18M, 18C, and 18K; an endless belt corresponds to an intermediate transferring belt 13; an environment detection part correspond to an environment sensor 101; a control part corresponds to a CPU 103; and storage parts corresponds to memories 102 and 120.

According to the above-mentioned image color forming apparatus, an amount of positional error due to change of environment outside the apparatus is estimated for every component so that the amount of the positional error is made functional and calculated, and thereby positioning is done at real time. Hence, it is possible to avoid down time.

Other objects, features, and advantages of the present invention will be come more apparent from the following detailed description when read in conjunction with the accompanying drawings.

DETAILED DESCRIPTION OF THE PREFERED EMBODIMENTS

A description is given below, with reference to FIG. 1 through FIG. 14 of embodiments of the present invention.

Figure 1:
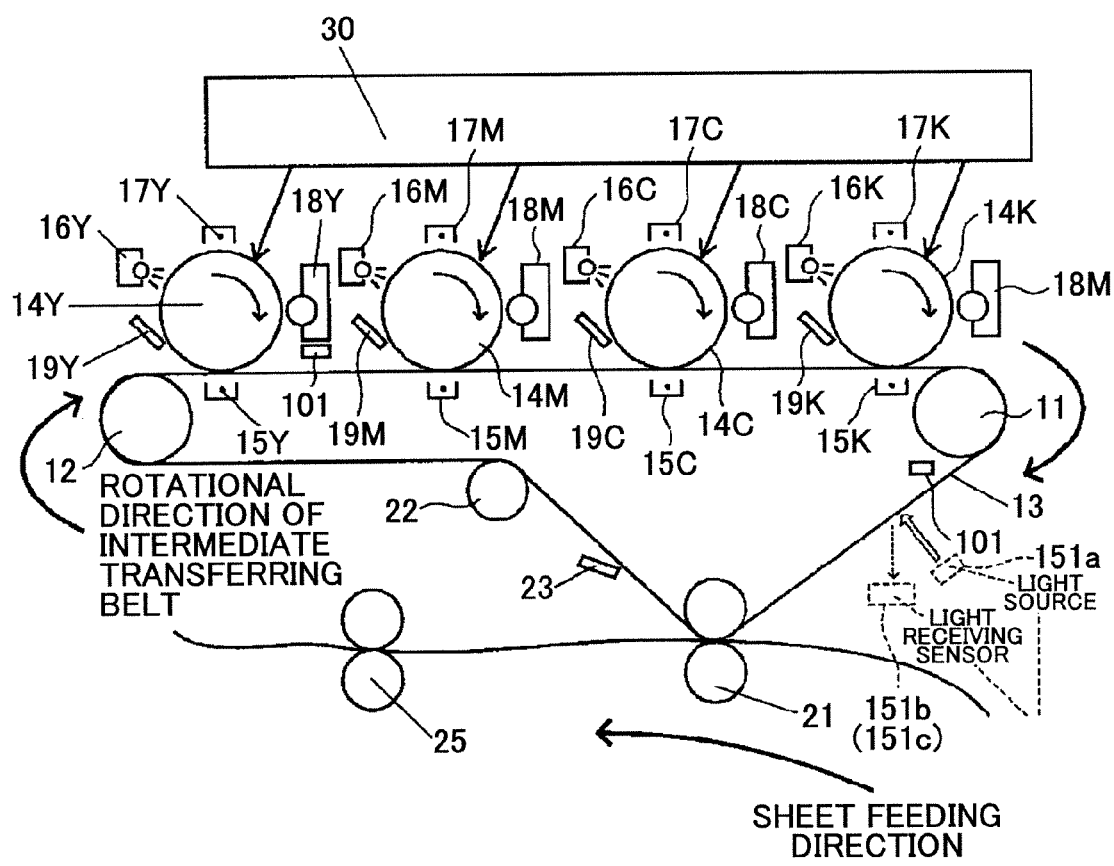
FIG. 1 is a schematic view showing a structure of an image forming apparatus of an embodiment of the present invention.

FIG. 1 is a schematic view showing a structure of a tandem type image forming apparatus of an embodiment of the present invention.

As shown in FIG. 1, an endless intermediate transferring belt 13 is provided between a driving roller 11 and idler roller 12. The intermediate transferring belt 13 is made of synthetic resin such as polyimide.

Four photosensitive body drums 14Y, 14M, 14C, and 14K of yellow (Y), magenta (M), cyan (C), and black (K) are provided above the intermediate transferring belt 13 along a conveyance direction of the intermediate transferring belt 13. The intermediate transferring belt 13 is rotated clockwise in FIG. 1.

Primary transferring devices 15Y, 15M, 15C, and 15K are provided under the photosensitive body drums 14Y, 14M, 14C, and 14K, respectively via the intermediate transferring belt 13.

Static eliminators 16Y, 16M, 16C, and 16K, electric chargers 17Y, 17M, 17C, and 17K, developing devices 18Y, 18M, 18C, and 18K, and cleaning devices 19Y, 19M, 19C, and 19K are arranged around the photosensitive body drums 14Y, 14M, 14C, and 14K, respectively.

The static eliminators 16Y, 16M, 16C, and 16K perform static elimination of the photosensitive body drums 14Y, 14M, 14C, and 14K. The electric chargers 17Y, 17M, 17C, and 17K charge the photosensitive body drums 14Y, 14M, 14C, and 14K. The developing devices 18Y, 18M, 18C, and 18K develop latent images on the photosensitive body drums 14Y, 14M, 14C, and 14K. The cleaning devices 19Y, 19M, 19C, and 19K clean toners remaining after transferring toner images to the intermediate transferring belt 13 is implemented by primary transferring devices.

Secondary transferring rollers 21 are provided under the intermediate transferring belt 13. The secondary transferring rollers 21 form a secondary transferring device configured to transfer the toner image formed on the intermediate transferring belt 13 to a transferring sheet as a recording medium.

The intermediate transferring belt 13 is supported by a supporting roller 22. A cleaning device 23 is provided between the supporting roller 22 and the secondary transferring rollers 21 so as to remove residual toner remaining on the intermediate transferring belt 13 after a toner image is transferred to the transferring sheet. The toner image transferred to the transferring sheet is fixed to the transferring sheet by a fixing device 25.

An optical beam scanning device 30 is provided above the photosensitive body drums 14Y, 14M, 14C, and 14K. By the optical beam scanning device 30, latent image of single colors of yellow, magenta, cyan, and black are formed on the photosensitive body drums 14Y, 14M, 14C, and 14K, respectively. These latent images are developed by the corresponding developing devices 18Y, 18M, 18C, and 18K. These single color images are transferred onto the intermediate transferring belt 13 in order and overlapped so that a color image is formed.

The color image formed on the intermediate transferring belt 13 is transferred to the transferring sheet by the secondary transferring rollers 21 and fixed on the transferring sheet by the fixing device 25. These structure are known, and therefore detailed structure or explanation is omitted.

Figure 2:
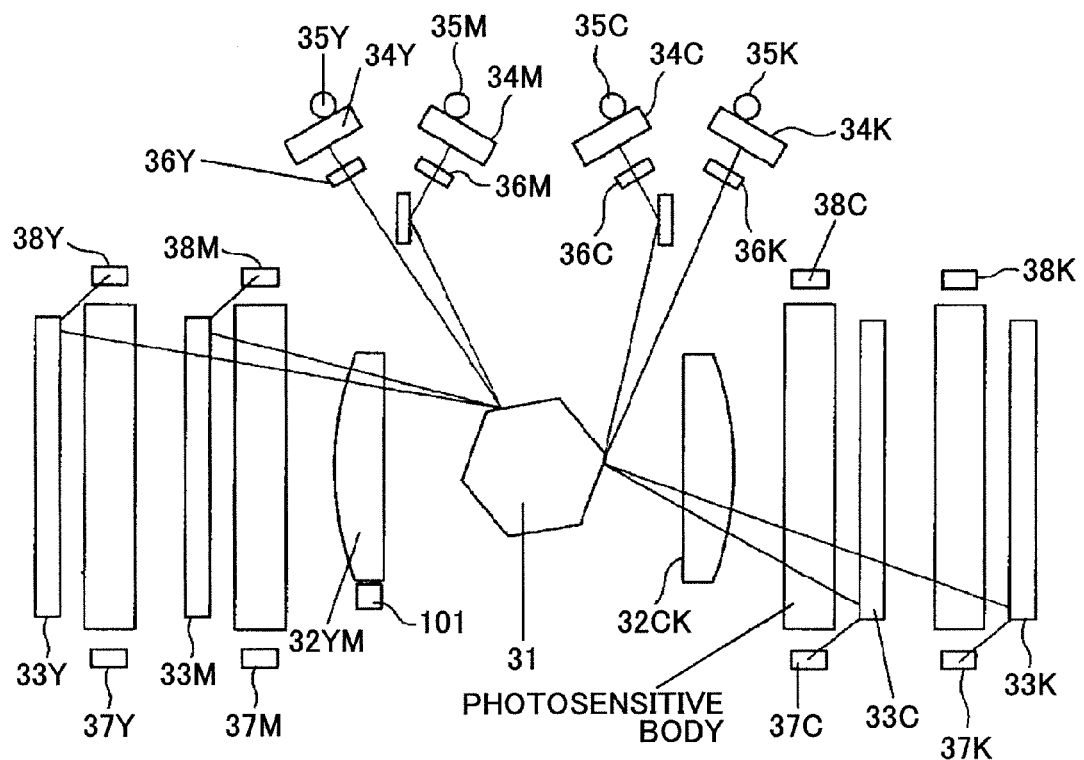
FIG. 2 is a plan view showing a structure of an optical writing device of the image forming apparatus shown in FIG. 1.

FIG. 2 is a plan view showing a structure of the optical writing device 30 of the image forming apparatus shown in FIG. 1.

As shown in FIG. 2, the optical beam scanning device 30 includes a single polygon mirror 31 rotated by a polygon motor not shown in FIG. 2. The polygon mirror 31 has a polyhedral-shaped plan configuration, a hexahedral-shaped plan configuration in the case of the example shown in FIG. 2. This polygon mirror 31 has end surfaces reflecting the laser light.

Two optical beams, upper and lower, are irradiated onto a mirror surface of the polygon mirror 31. These optical beams are for scanning different basic colors.

In addition, another two optical beams, upper and lower, are irradiated in opposite direction in a state where the polygon mirror 31 is a center and reflected by a mirror surfaces. As a result of this, optical beams of four colors, yellow, magenta, cyan, and black, are led to the photosensitive body drums 14Y, 14M, 14C, and 14K, respectively, for scanning.

The deflected optical beams of the four colors are reflected by the polygon mirror 31, pass through the corresponding fθ lenses 32YM and 32 CK, and are bent by the corresponding bending mirrors 33Y, 33M, 33C, and 33K, so as to scan on the corresponding photosensitive body drums 14Y, 14M, 14C, and 14K.

The optical beams of four colors come out from laser diodes (hereinafter LDs) 35Y, 35M, 35C, and 35K provided at LD drive boards 34Y, 34M, 34C, and 34K, respectively. These optical beams pass through the cylindrical lenses 36Y, 36M, 36C, and 36K so as to be converted into balanced beams. The optical beams from the LDs 35Y and 35K directly reach and the optical beams from the LDs 35M and 35C, via the reflection mirrors 36M and 36C, reach the corresponding photosensitive body drums 14Y, 14M, 14C, and 14K.

Head end synchronization detection sensors 38Y, 38M, 37C, and 37K and rear end synchronization detection sensors 37Y, 37M, 38C, and 38K are provided at corresponding end parts in an axial direction of the corresponding photosensitive body drums 14Y, 14M, 14C, and 14K.

The optical beams are set so as to irradiate onto the corresponding synchronization detection sensors 37Y, 37M, 37C, 37K, 38Y, 38M, 38C, and 38K at an initial time and an end time of scanning.

The synchronization detection sensors 38Y, 38M, 37C, and 37K are used for making synchronization of a writing start position in a main scanning direction. The synchronization detection sensors 37Y, 37M, 38C, and 38K are used for making synchronization of a writing end position in the main scanning direction.

During operation of the image forming apparatus, heat may be generated from the polygon mirror 31. This heat may cause color shifting. In this embodiment, the image forming apparatus includes an environment sensor 101 so that environmental data such as temperature or moisture of the image forming apparatus can be known.

In this embodiment, the environment sensor 101 is formed by a thermometer or a hygrometer and provided in the vicinities of the developing device 18Y and the intermediate transferring belt 13. Since properties of the developing device may be changed by temperature or relative humidity, it is beneficial to provide the environment sensor 101 in the vicinity of the developing device 18Y.

While the environment sensor 101 is provided at only the developing device 18Y of yellow in the example shown in FIG. 1, the environment sensors may be provided at all of the developing devices.

In addition, resist in a sub-scanning direction of the intermediate transferring belt 13 is shifted due to change of the diameter of the driving roller 11, expansion of the intermediate transferring belt 13, or change of thickness of the intermediate transferring belt 13. Especially, if the intermediate transferring belt 13 is made of polyimide, the intermediate transferring belt 13 is contacted due to decrease of relative humidity. In order to make functional use of them and calculate the amount of positional error securely, the environment sensor 101 may be arranged in the vicinity of or inside the driving roller 11 and in the vicinity of the intermediate transferring belt 13.

Furthermore, the fθ lens may be made of plastic. In this case, since the fθ lens is expanded/contracted due to temperature, the main scanning magnification is changed. Therefore, it is beneficial to provide the environment sensor 101 at the fθ lens.

While the environment sensors 101 are provided at only the fθ lenses 32Y and 32M in this example, the environment sensor 101 may be provided at the fθ lenses 32C and 32K or both fθ lenses 32Y and 32M and fθ lenses 32C and 32K. In addition, the environment sensors 101 may be provided in the vicinity of the toroidal lenses (not shown). The toroidal lens is used for optical face tangle error correction and may cause change of the sub-scanning position. In addition, heat generated by the polygon mirror 31 is measured by the environment sensor 101.

Figure 3:
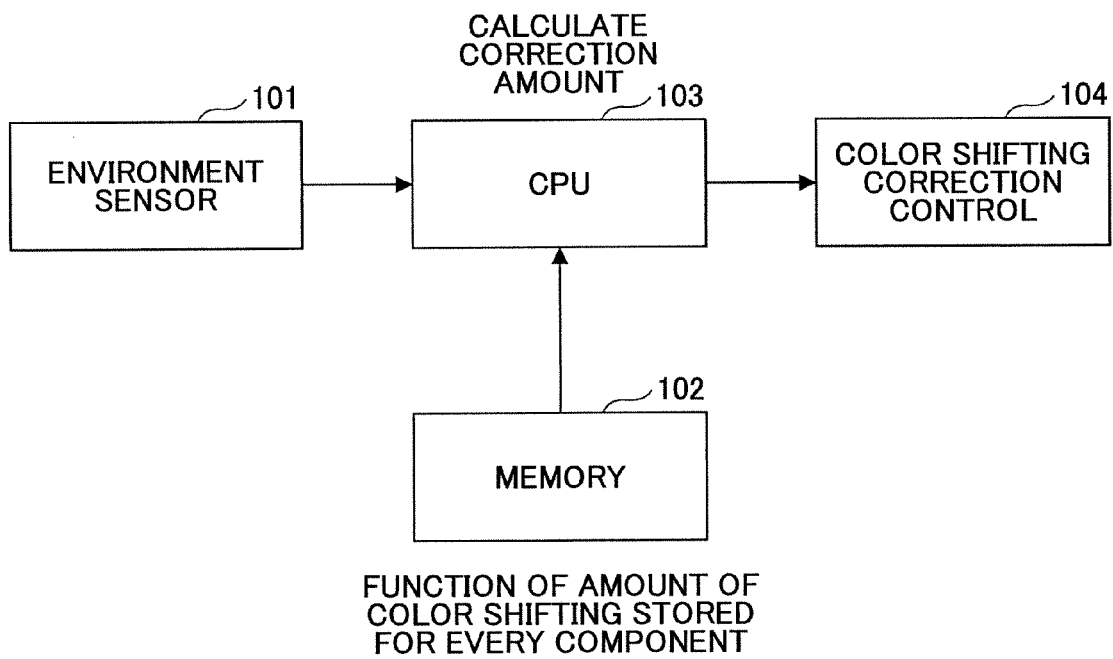
FIG. 3 is a block diagram showing a basic structure of a positional error correction device.

FIG. 3 is a block diagram showing a basic structure of the positional error correction device. The positional error correction device includes the environment sensor 101, the memory 102, the CPU 103, and the correction control part 104.

The memory 102 stores an amount of color shifting accompanying change of temperature and humidity of the developing device 18Y, change of the diameter of the driving roller 11, expansion of the intermediate transferring belt 13, or change of thickness of the intermediate transferring belt 13, as functions.

The CPU 103 calculates the correction value of the color shifting based on the function stored at the memory 102 and the data of the environment sensors 101. The color shifting correction control part 104 implements color shifting correction based on the output from the CPU 103.

Figure 4:
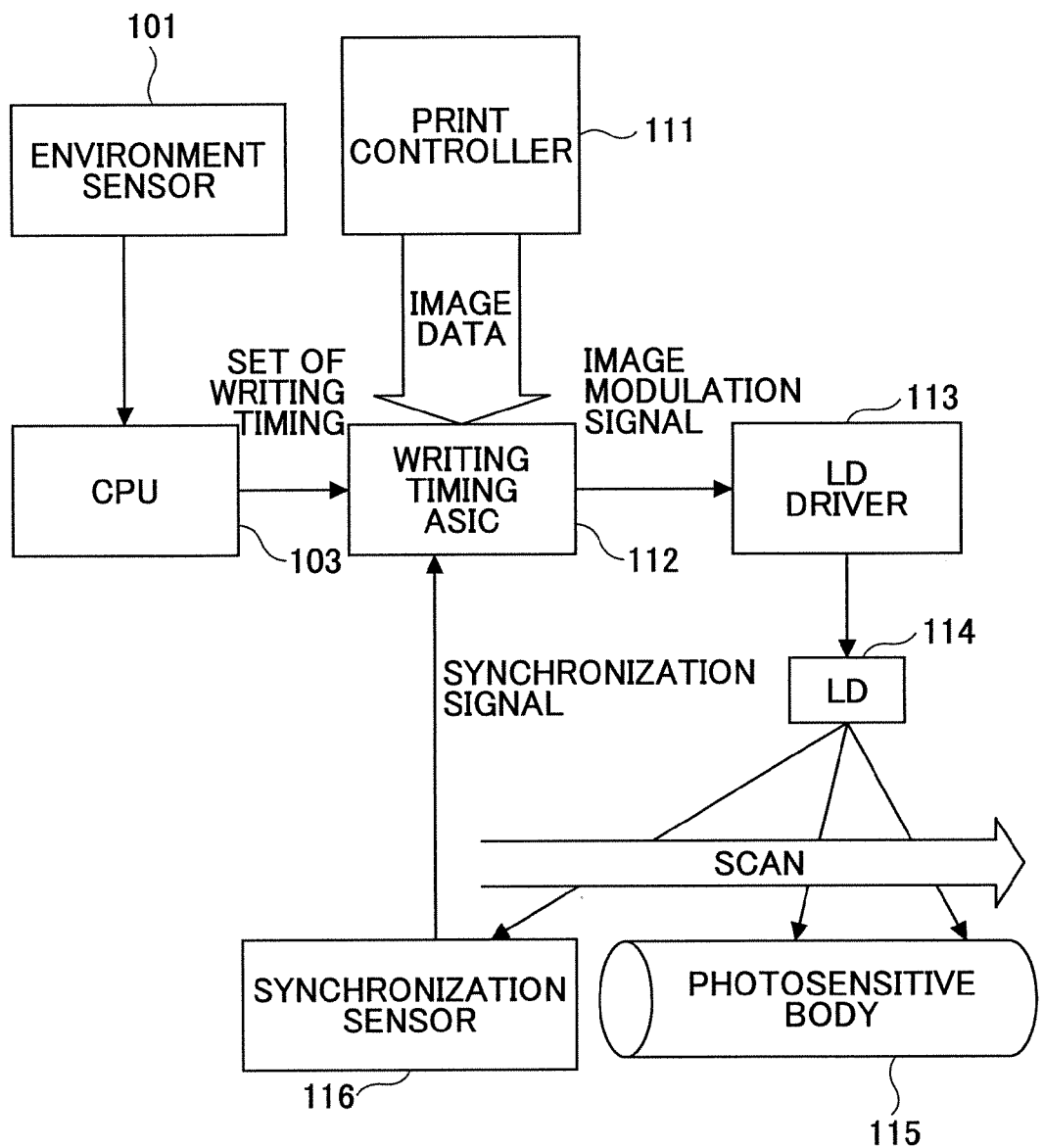
FIG. 4 is a block diagram showing a first example of a writing part.

FIG. 4 is a block diagram showing a first example of a writing part. The measured environmental data are given from the environment sensor 101 of the positional error correction device shown in FIG. 3 to the writing part.

The writing part also includes the CPU 103 for controlling, a print controller 111 configured to output image data, and a writing timing control part 112. The writing timing control part 112 changes the image data given from the print controller 111 to an image modulation signal and outputs it. The writing timing control part 112 controls the writing timing based on the correction amount from the CPU 103.

The writing part also includes an LD driver 113 controlled by an image modulation signal from the writing timing control part 112. Since plural basic colors are overlapped for forming an image in the color image forming apparatus as discussed above, in this example where four basic colors are used, the LD driver 113 includes four color LD driver boards 34Y, 34M, 34C, and 34K.

The writing part also includes the LD 114 driven by the LD driver 113. The LD 114, as well as the LD driver 113, includes four color LDs 35Y, 35M, 35C, and 35K.

The writing part also includes the photosensitive body 115 scanned by the optical beam from the LD 114. The photosensitive body 115 includes four color photosensitive bodies 14Y, 14M, 14C, and 14K.

The writing part also includes a synchronization sensor 116. The synchronization sensor 116 includes the head end synchronization detection sensors 38Y, 38M, 37C, and 37K and the rear end synchronization detection sensors 37Y, 37M, 38C, and 38K. The synchronization signal from the synchronization sensor 116 is output to the writing timing control part 112 and used for control of the writing timing.

Figure 5:
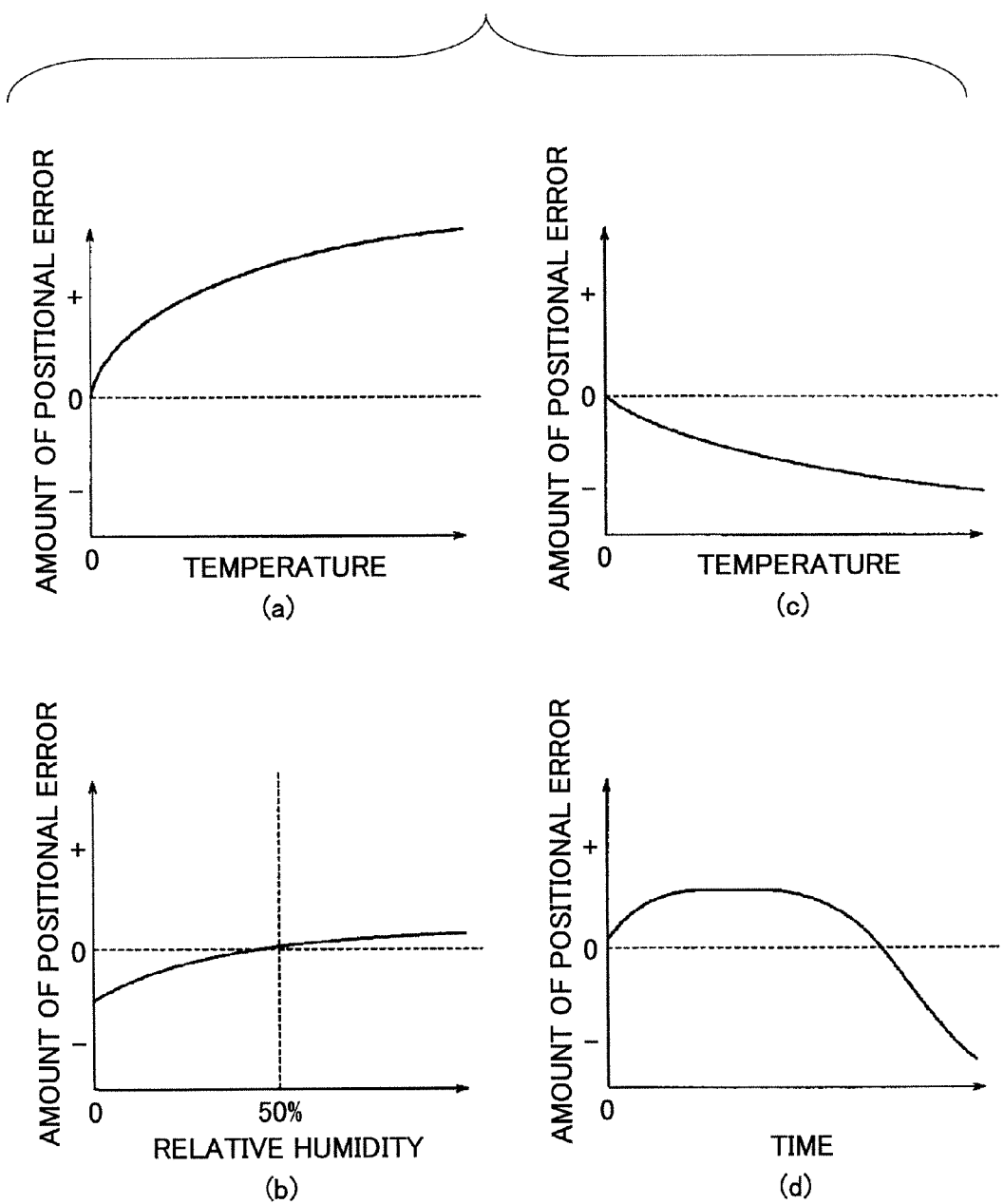
FIG. 5 is graph showing change of an amount of positional error for change of a value of environmental data ((a) shows change of an amount of positional error for change in temperature of an intermediate transferring belt; (b) shows change of an amount of positional error for change in humidity of an intermediate transferring belt; (c) shows change of an amount of positional error for change in temperature of an optical beam scanning device; and (d) shows change of an amount of positional error over time when the image forming apparatus is continuously operated.)

FIG. 5 is graph showing change of an amount of positional error for change of value of environmental data ((a) shows change of an amount of positional error for temperature change of the intermediate transferring belt 13 made of polyimide; (b) shows change of an amount of positional error for humidity change of the intermediate transferring belt 13; (c) shows change of an amount of positional error for temperature change of an optical beam scanning device; and (d) shows change of an amount of positional error when the image forming apparatus is continuously operated over a time period.). The changes shown in FIG. 5(a), FIG. 5(b) and FIG. 5(c) can be indicated by functions.

When the image forming apparatus starts operating, the intermediate transferring belt 13 is warmed so that the amount of the positional error starts being shifted to a + side. However, the temperature of the optical beam scanning device 30 gradually increases so that the positional error starts being shifted to a − side. Finally, the humidity in the apparatus is decreased as the temperature in the apparatus is increased so that the amount of positional shift is shifted to the − side more.

A sum amount D of positional errors is expressed by the following equation (1) wherein "t" indicates temperature, "r" indicates relative humidity, a function fb(t) indicated by the graph (a), a function fb(r) indicated by the graph (b), and a function fl(t) indicated by the graph (c).

$$D = fb(t) + fb(r) + fl(t) \quad (1)$$

Thus, the change of the positional error for the temperature change or the change of the positional error for the humidity change of the components generating the reason for the color shifting is made to be a function. This function is stored in the memory. During the operation of the image forming apparatus, such a function is read for calculating and the amount of positional error is calculated. As a result of this, the positioning can be done at substantially real time and therefore down time can be prevented.

Figure 6:
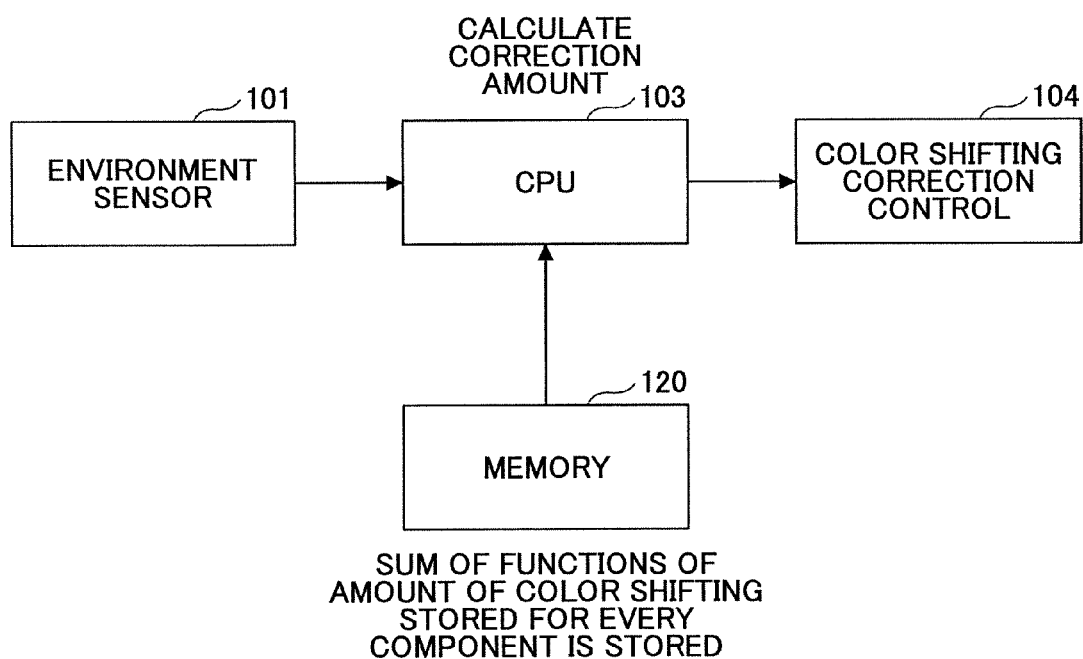
FIG. 6 is a block diagram showing another basic structure of the positional error correction device.

FIG. 6 is a block diagram showing another basic structure of the positional error correction device. While the function of the amount of color shifting stored for every component is stored in the memory 102 in the example shown in FIG. 3, the sum of the functions of the amount of color shifting stored for every component is stored in the memory 102 in a form of LUT (Look Up Table) in the example shown in FIG. 6.

The sum of the functions of the amount of color shifting is defined by the above-mentioned formula (1) to calculate the sum of the amount of the color shifting for the change in relative humidity r. In this case, the sum of the functions of the amount of color shifting is a sum of the temperature function fb(t) of the positional error of the intermediate transferring belt 103, the temperature function fb(r) of the positional error of the intermediate transferring belt 103, and the temperature function fl(t) of the positional error of the lens and the mirror.

Because of this, in this case unlike the case where each of the functions are individually stored so that the amount of the positional error is calculated, the sum of the positional error due to the change in temperature or humidity at the time of detection can be determined without individual calculation of the positional error amounts by referring to the detected temperature of the intermediate transferring belt and the detected temperature of the lens or the mirror with the LUT.

Therefore, while the calculation time is required when the functions indicating the change of the amount of the positional error shown in FIG. 5 are individually stored so that the sum of the positional error amounts is obtained, only referencing the LUT is required in the case where the sum of the functions of the amount of color shifting is stored so that the process can be implemented in real time.

Although the example where the sum of the amount of color shifting for the change in relative humidity r is calculated is discussed here, one of the properties shown in FIG. 5 can be optionally selected as the parameter being the standard.

Figure 7:
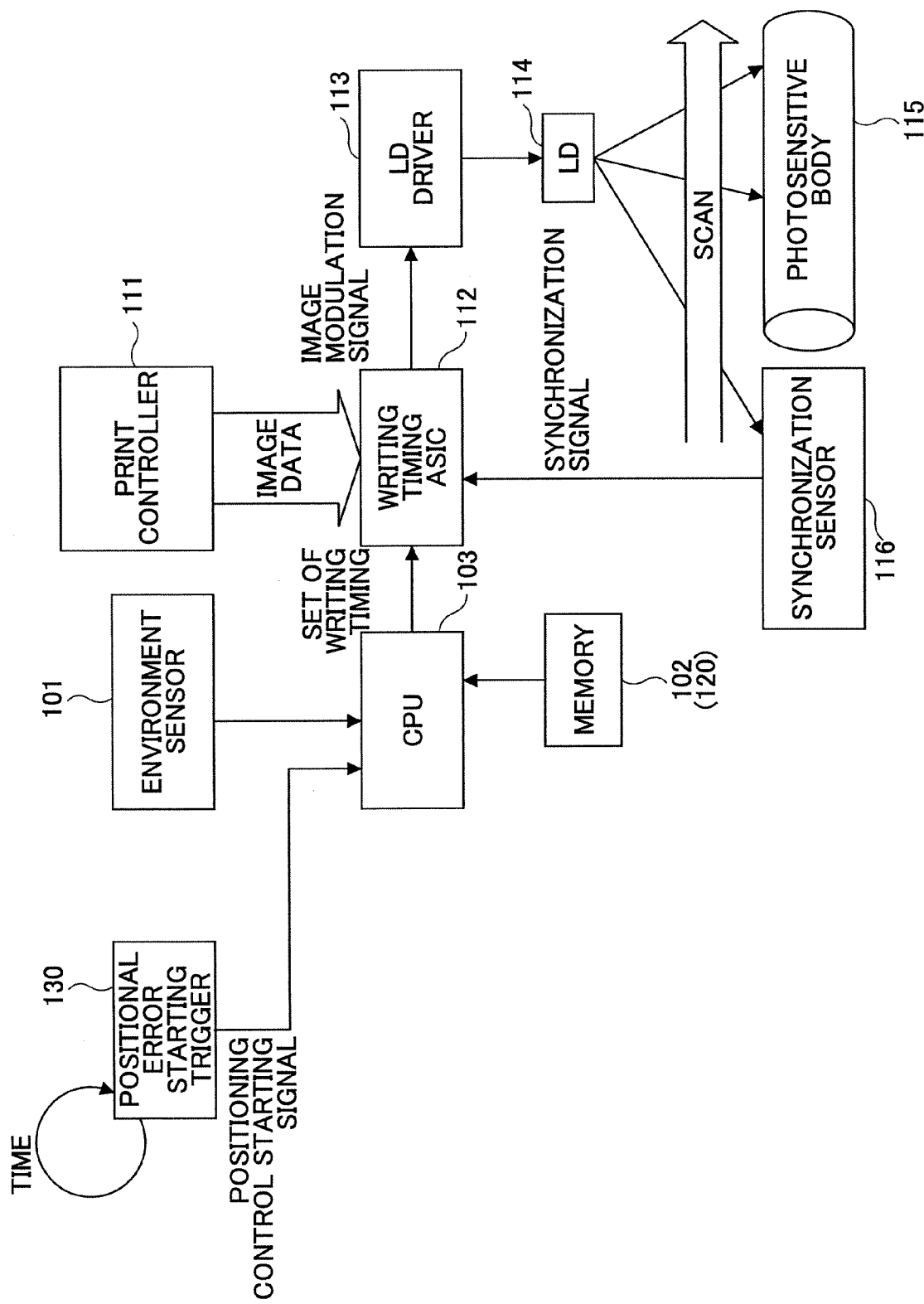
FIG. 7 is a block diagram showing a second example of the writing part.

FIG. 7 is a block diagram showing a second example of the writing part. The positioning control is implemented for every set time in the second example. In other words, the positioning is made by the corrected value calculated by the CPU 103 every set time. In this example, the memory 102 (120) and the positional error correction starting trigger circuit 130 configured to output the positional error correction starting signal for every time set in advance to the writing part of the first example are provided, and the output signal is applied from the positional error correction staring trigger circuit 130 to the CPU 103. The positional error correction starting trigger circuit 130 may output the positional error correction starting signal when the number of the sheets achieves the number set in advance. When the CPU 103 receives the positional error correction starting signal, the function is read from the memory 102(120) so that the amount of the positional error is calculated. Based on the result, the positioning is done.

Figure 8:
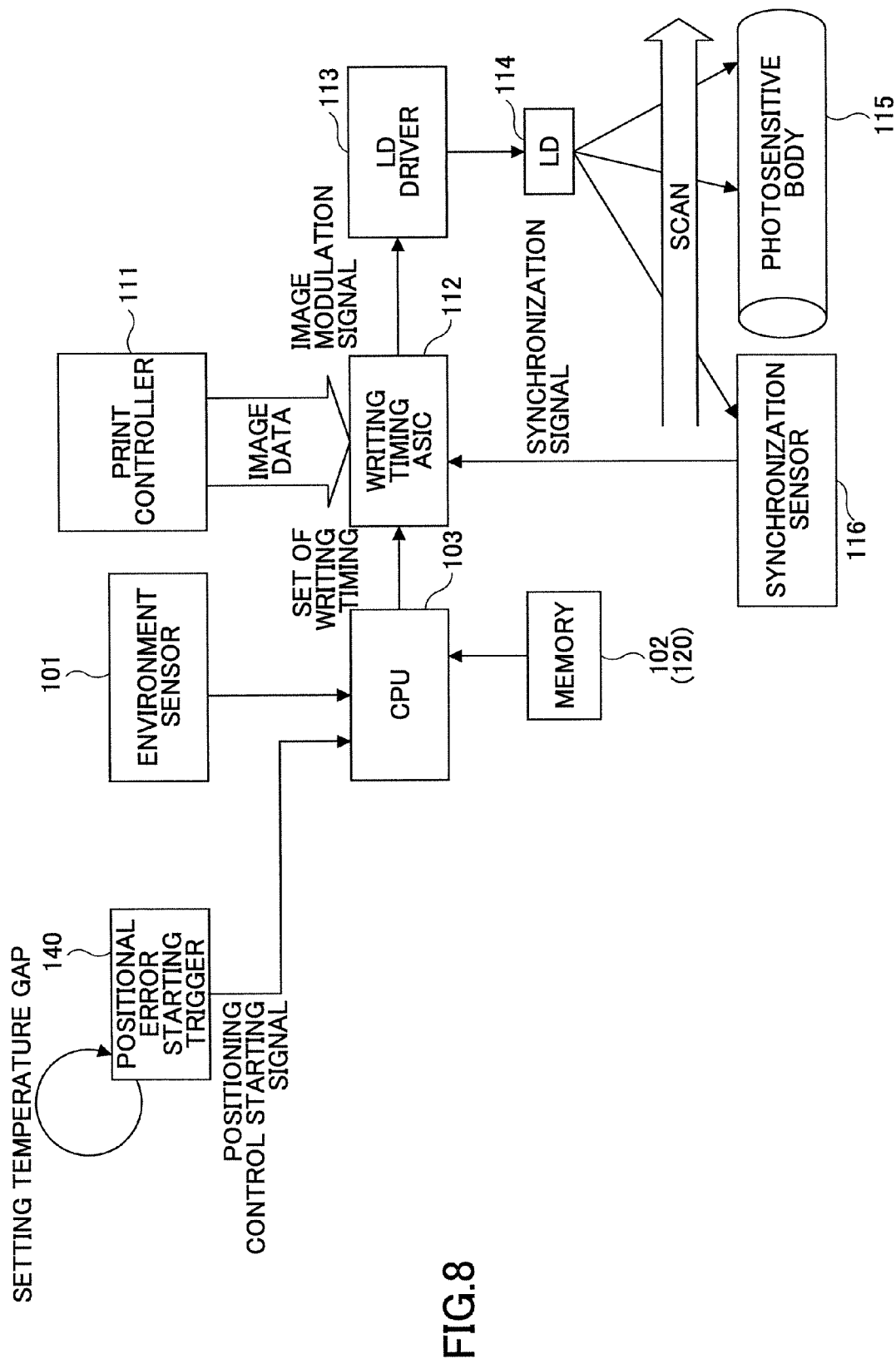
FIG. 8 is a block diagram showing a third example of the writing part.

FIG. 8 is a block diagram showing a third example of the writing part. In the third example, the positioning is made by the correction value calculated by the CPU 103 every temperature gap set in advance. The positional error correction starting trigger circuit 140, instead of the writing part of the first example, is provided in this example. The positional error correction starting trigger circuit 140 applies the positional error correction starting signal to the CPU 103 based on the detection output from the environment sensor 101.

The positional error correction starting signal output from the positional error correction starting trigger 140 is output for every temperature gap set in advance, every time when the temperature is changed 5° C., for example, based on temperature information of the intermediate transferring belt 13, the developing device 18M, and the optical beam scanning device 30 input from the environment sensor 101.

When receiving the positional error correction starting signal, the CPU 103 reads the function from the memory 102 (120) so as to calculate the amount of the positional error. Based on the result of the calculation, positioning is done.

Figure 9:
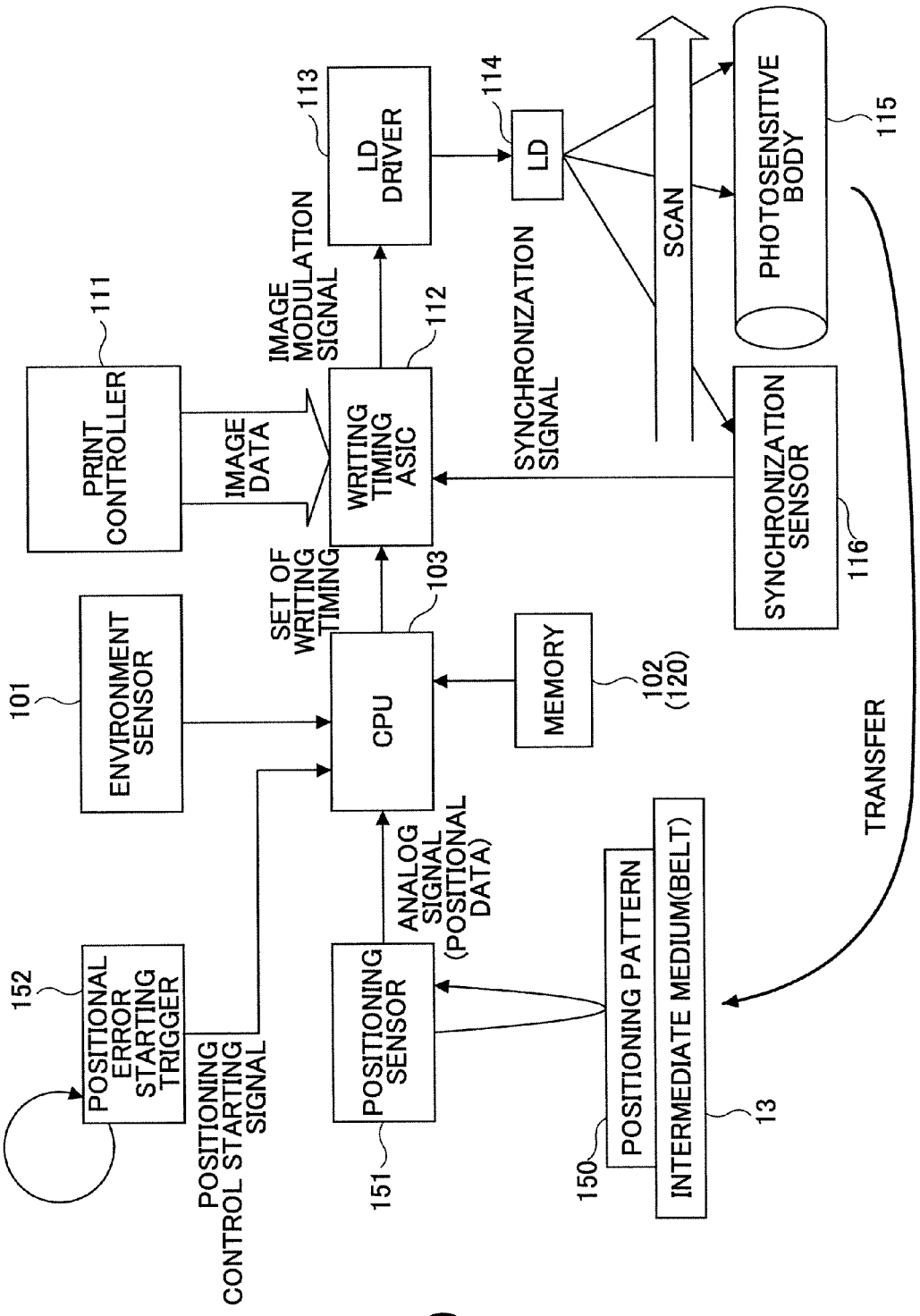
FIG. 9 is a block diagram showing a fourth example of the writing part.
Figure 10:
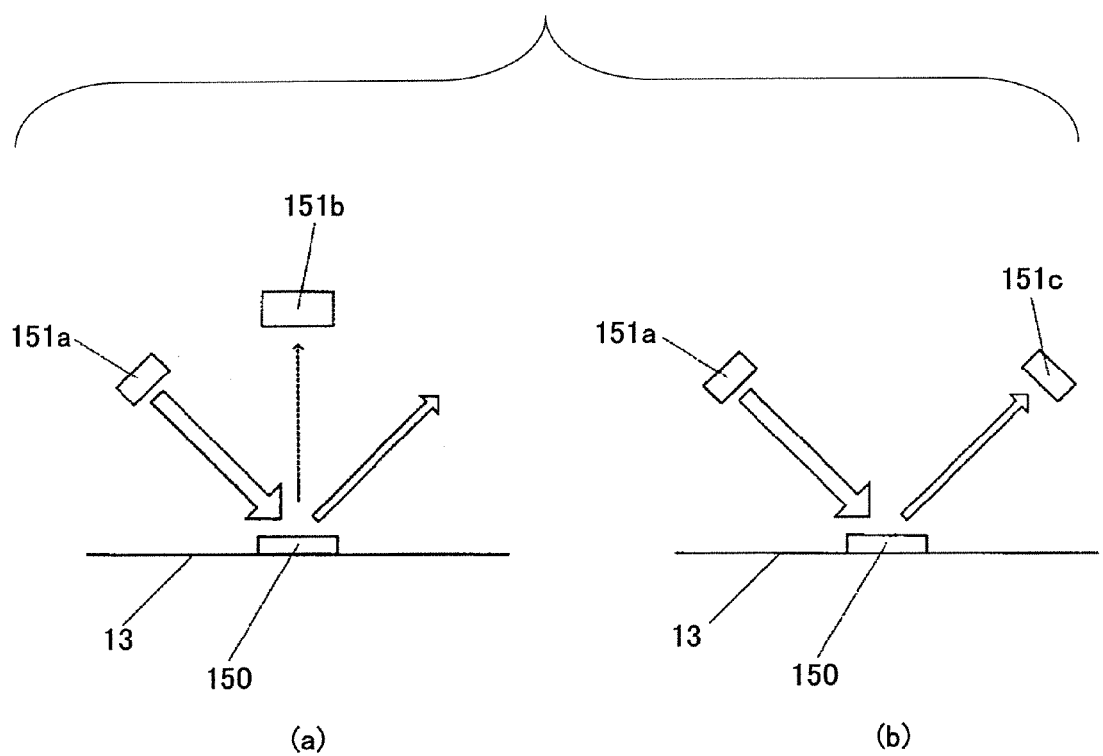
FIG. 10 is a view showing a positioning sensor of the fourth example ((a) shows a diffusion light sensor type; and (b) shows a regular reflection light sensor type)

FIG. 9 is a block diagram showing a fourth example of the writing part. FIG. 10 is a view showing a positioning sensor of the fourth example ((a) shows a diffusion light sensor type; and (b) shows a regular reflection light sensor type). In the fourth example as compared to the third example, the output of the positioning sensor 151 is input to the CPU 103.

In a case where the diffusion light sensor is used as the positioning sensor 151, as shown in FIG. 10(a), the light from the light source 151a formed by the LD or LED is irradiated onto the positioning pattern 150 and the diffusion light is received by the diffusion light sensor 151b arranged in a position where the reflection light is not received. In a case where the regular reflection light sensor is used, as shown in FIG. 10(b), the light from the light source 151a reflected to the positioning pattern 150 is received by the reflection light sensor 151c.

Figure 11:
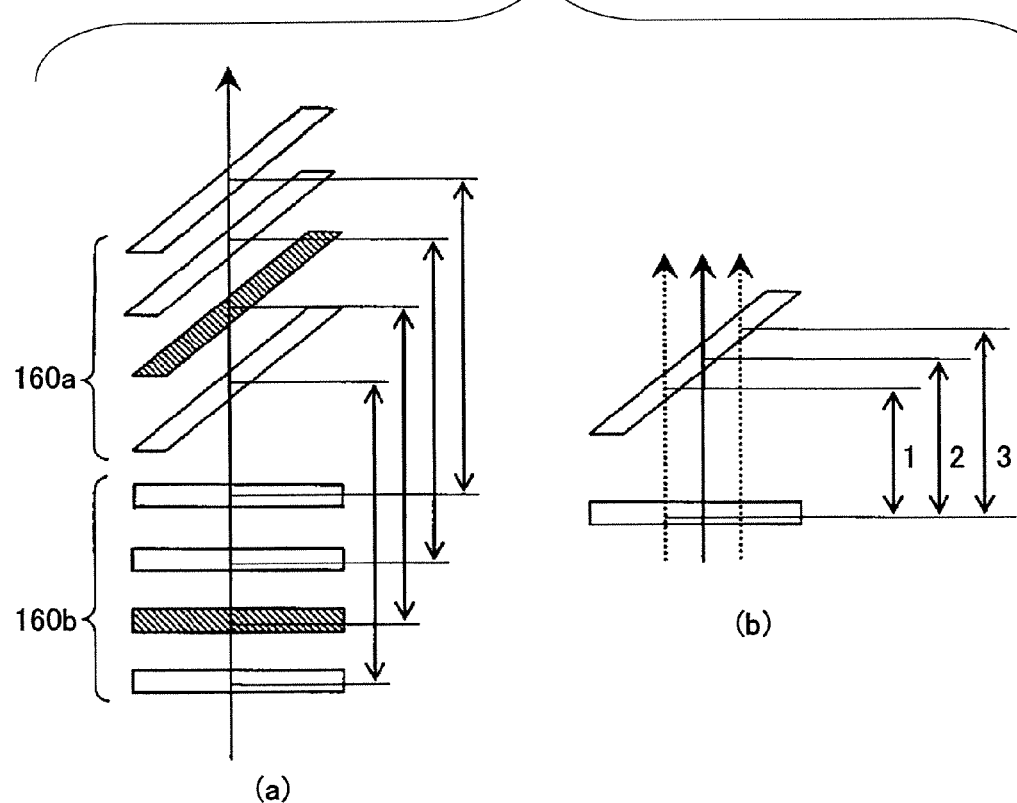
FIG. 11 is a view showing a positioning pattern ((a) shows a pattern for detecting a main scanning shift amount; (b) shows a case where the pattern for detecting the main scanning shift amount is actually shifted; (c) shows a pattern for detecting a sub-scanning shift amount; and (d) a case where the pattern for detecting the sub-scanning shift amount is actually shifted)
Figure 11:
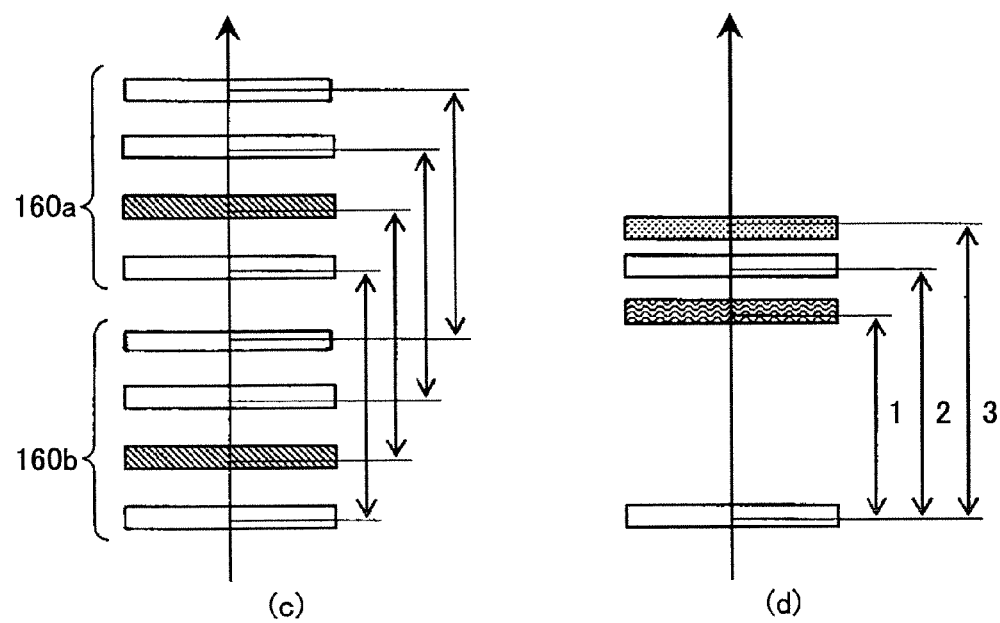

FIG. 11 is a view showing a positioning pattern formed on the intermediate transferring belt 13 ((a) shows a pattern for detecting a main scanning shift amount; (b) shows a case where the pattern for detecting the main scanning shift amount is actually shifted; (c) shows a pattern for detecting a sub-scanning shift amount; and (d) a case where the pattern for detecting the sub-scanning shift amount is actually shifted). These patterns may be used corresponding to the regular reflection light sensor as shown in FIG. 10(b).

The main scanning shift amount detection pattern is formed by a parallel line of each of colors parallel with the main scanning direction and an inclination line of each of colors inclined against these lines. On the other hand, the sub-scanning shift amount detection pattern is formed by parallel lines 161a and 161b of each of colors of two pairs parallel with the main scanning direction.

The main scanning shift amount is an amount of shift when an arrow 2 is situated at an ideal position in FIG. 11(b). By detecting this amount, it is determined that the shift amount of each of colors be zero (0).

The arrows 1 and 3 indicate shift amounts where each of colors is shifted. By detecting this by the positioning sensor 151, a relative comparison with the standard color (mainly black) can be made. Since it is difficult to directly detect the gap of the main scanning, a center passing position of the sensor 151 is determined by the distance between the parallel line 160a and the inclination line 160b so that the main scanning shift can be obtained based on the result of this determination.

The sub-scanning shift amount can be obtained by obtaining the distance between the lines of the same colors of the parallel lines 161a and 161b. In other words, as shown in FIG. 11(d), the arrow 2 indicates the shift amount in the case of the ideal position. The arrow 1 or 3 indicates the shift amount when each of colors is shifted.

Figure 12:
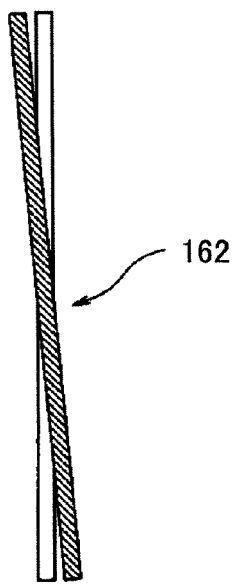
FIG. 12 is a view showing a positioning pattern of the diffusion light sensor.
Figure 13:
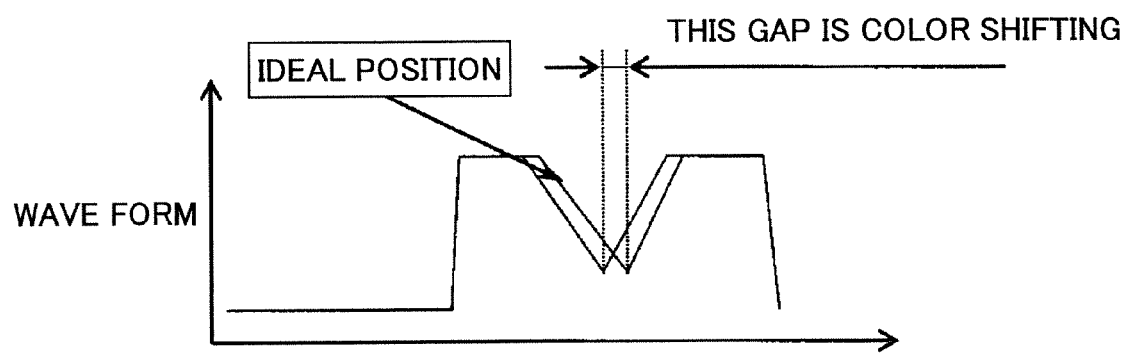
FIG. 13 is a graph showing a relationship between an ideal line and a measure line of the pattern.

FIG. 12 is a view showing a positioning pattern used corresponding to the diffusion light sensor.

Since the diffusion light (irregular reflection) is generated by the light from the light source and the pattern contacting each other, plural patterns formed by overlapping the standard black pattern and a subject color namely a color for positional error detection are made. As shown in FIG. 12, an overlapping amount of the black color pattern and the pattern of the subject color are changed in order.

As this overlapping amount is increased, reflection generated by the black color pattern is decreased. Therefore, as this overlapping amount is increased, the strength of the reflection light is decreased. When the black color pattern and the subject color pattern are completely overlapped, the strength of the reflection light is lowest. By comparing the position where the strength of the reflection light is lowest and the ideal position, the color shift amount namely how much the position of the subject color is shifted can be measured.

In the fourth example, positioning control by forming the positioning pattern shown in FIG. 11 is implemented by the set trigger in addition to the above-discussed real time positioning control. Here, the set trigger is that, for example, the number of passing sheets exceeds the designated number, the temperature change amount exceeds the designated range, and others.

In the positioning control based on the set trigger, positioning pattern data are formed by the CPU 103 or the writing timing part 112. Based on the data, the LD driver 113 drives the LD 114, so that positioning pattern 150 is formed on the intermediate transferring belt 13. The positioning sensor 151 detects this positioning pattern 150 and the data of the amount of positional shift are obtained from the position of the detected positioning pattern 150.

The data of the obtained amount of the positional shift are output to the CPU 103 as an analog signal. The CPU 103 quantizes the analog signal by an A/D converter in the CPU 103 so that the CPU 103 takes it as the positional shift data. The CPU 103, based on the positional shift data, implements the positional error correction so as to reset the writing timing.

In the fourth example the positional error correction starting trigger circuit 152 outputs the positional error correction starting signal when the number reaches the number of passing sheets set in advance.

Figure 14:
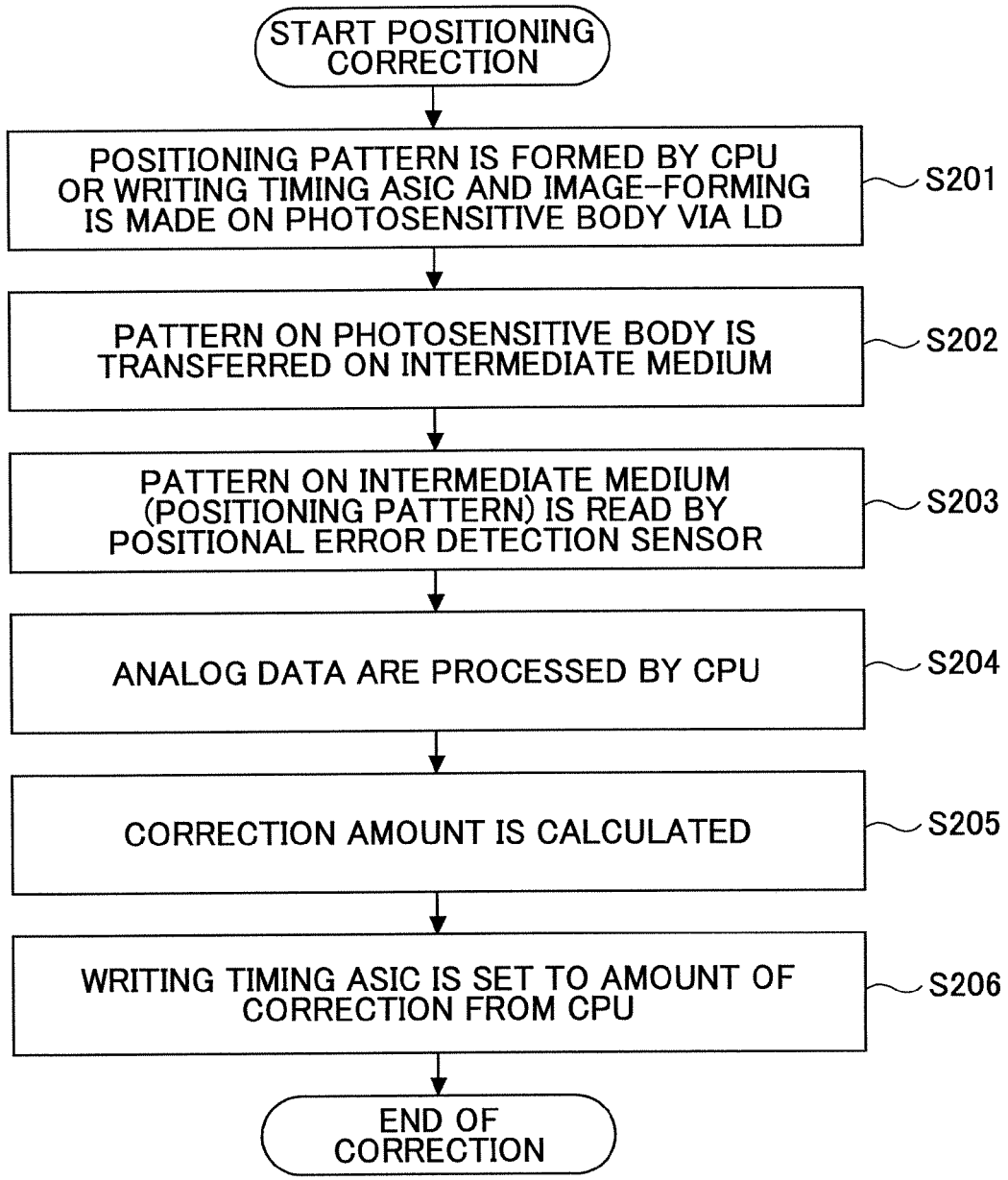
FIG. 14 is a flowchart of a positioning control by the positioning pattern.

FIG. 14 is a flowchart of positioning control by the positioning pattern.

In this control process, after the positioning correction is started, the positioning pattern 150 is formed by the CPU 103 or the writing timing 112 and image-forming is made on the photosensitive body 115 by the LD 114 in S201.

Next, the pattern on the photosensitive body 115 is transferred on the intermediate transferring belt 13 as an intermediate medium in S202.

The positioning pattern transferred on the intermediate transferring belt is read by the positioning sensor 151 in S203.

The CPU 103 digitally converts the analog data input from the positioning sensor 151 so that the amount of positional error is determined in S204. Based on the amount of the positional shift, the correction amount is calculated in S205.

The CPU 103 sets the writing timing in the writing timing control part 112 based on the correction amount in S206. As a result of this, the writing timing control part 112 adjusts the writing timing based on the amount of correction from the CPU 103, and therefore the positioning process is completed.

Thus, in the fourth example, while the positioning control is done in real time, positioning can be done by using the positioning pattern every set number of the passing sheets. By changing the positional error starting trigger circuit 152 to the positional error correction starting trigger circuit 130 of FIG. 7 or the positional error starting trigger circuit 140 in FIG. 8, positioning can be done made based on the trigger such as time or setting temperature gap.

Thus, according to the above-discussed embodiment, it is possible to provide a color image forming device, including: an optical scanning part; an image carrier where a latent image is formed by the optical scanning part; a developing part configured to develop the latent image of the image carrier; an endless belt configured to move so as to come in contact with the image carrier where the developed image is formed; an environment detection part provided at least at one of the optical scanning part, the image carrier, the developing part, and the endless belt, the environment detection part being configured to obtain environmental data; and a control part configured to implement positioning control based on the environmental data from the environment detection part.

The color image forming device may further include: a storage part configured to store a function for obtaining a positional error amount corresponding to components generating a position error due to change of a value of the environmental data. The control part may calculate the positional error amount based on the function stored in the storage part and implement positional shift correction control based on the positional shift amount, so that positioning is done.

The components generating the position errors due to change of the value of the environmental data may be plural, the storage part may store a function for obtaining the positional error amount of each of the plural components; and the control part may calculate a sum of the positional error amounts of each of the plural components as a sum positional shift amount and implements the positional shift correction control based on the sum positional shift amount, so that the positioning is done.

The storage part may store the sum positional shift amount calculated by the function for obtaining the positional shift amount of each of the plural components in the form of a look-up table.

The environment detection part may be provided at least at one of a lens and mirror in the optical scanning part.

The control part may implement the positioning control every set time. The control part may implement the positioning control for every set number of sheets. The control part may implement the positioning control every time when a temperature change value exceeds a set value.

The color image forming device may further include a color adjustment pattern correction part configured to detect a positioning pattern formed at the endless belt and correct color shifting.

The endless belt may be made of polyimide. The environmental data may include at least one of data of temperature and data of humidity.

The present invention is not limited to these embodiments, but variations and modifications may be made without departing from the scope of the present invention.

This patent application is based on Japanese Priority Patent Application No. 2006-2619 filed on Jan. 10, 2006 and Japanese Priority Patent Application No. 2006-344368 filed on Dec. 21, 2006, the entire contents of which are hereby incorporated by reference.

What is claimed is:

1. A color image forming device, comprising:
   an optical scanning part;
   an image carrier where a latent image is formed by the optical scanning part;
   a developing part configured to develop the latent image of the image carrier;
   an endless belt configured to move so as to come in contact with the image carrier where the developed image is formed;
   a plurality of environment detection parts including a humidity detector and a temperature detector provided at least at one of the optical scanning part, the image carrier, the developing part, and the endless belt, the environment detection parts being configured to obtain environmental data;
   a storage part configured to store a positional error function, the positional error function including at least a temperature function and humidity function, the temperature and humidity functions generating respective positional errors due to changes of values of the environmental data; and
   a control part configured to calculate a sum positional error amount based on the positional error function and the environmental data, and
   configured to implement positioning control based on the sum positional error amount, wherein the sum positional error amount includes a sum of the positional errors generated by the temperature function and humidity function.

2. The color image forming device as claimed in claim 1, wherein the storage part stores the sum positional error amount in the form of a look-up table.

3. The color image forming device as claimed in claim 1, wherein the plurality of environment detection part are provided at least at one of a lens and mirror in the optical scanning part.

4. The color image forming device as claimed in claim 1, wherein the control part implements the positioning control every set time.

5. The color image forming device as claimed in claim 1, wherein the control part implements the positioning control for every set number of sheets.

6. The color image forming device as claimed in claim 1, wherein the control part implements the positioning control every time when a temperature change value exceeds a set value.

7. The color image forming device as claimed in claim 1, further comprising:
   a color adjustment pattern correction part configured to detect a positioning pattern formed at the endless belt and correct color shifting.

8. The color image forming device as claimed in claim 1 wherein the endless belt is made of polyimide.

9. The color image forming device as claimed in claim 1 wherein the environmental data include at least one of data of temperature and data of humidity.

10. The color image forming device as claimed in claim 1, wherein
    the positioning control based on the positional error amount is implemented in real time without down time.

* * * * *